United States Patent
Wilson et al.

(10) Patent No.: US 7,079,540 B1
(45) Date of Patent: Jul. 18, 2006

(54) SYSTEM AND METHOD FOR PROVISIONING VIRTUAL CIRCUITS IN BROADBAND ACCESS MULTIPLEXING ELEMENTS

(75) Inventors: Marvin Jeffery Wilson, Duluth, GA (US); Ren-Wei Liou, Dunwoody, GA (US); Thomas L. Georges, Roswell, GA (US); Harry Tang, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 927 days.

(21) Appl. No.: 10/112,558

(22) Filed: Mar. 28, 2002

(51) Int. Cl.
*H04L 12/56* (2006.01)
(52) U.S. Cl. .................... 370/395.3; 370/389
(58) Field of Classification Search ........ 370/389, 370/392, 395.1, 397, 399, 395.2, 395.3, 409, 370/395.31
See application file for complete search history.

(56) References Cited

U.S. PATENT DOCUMENTS 6,396,834 B1 * 5/2002 Bonomi et al. ............. 370/394
2002/0027922 A1 * 3/2002 Nicoll et al. ........... 370/395.63

* cited by examiner

*Primary Examiner*—Brenda Pham
(74) *Attorney, Agent, or Firm*—Withers & Keys, LLC

(57) ABSTRACT

A system for provisioning virtual circuits in broadband access multiplexing elements is disclosed. The system manages an algorithm that selects a unique virtual path identifier and virtual circuit identifier for each new multiplexor input from a pool. The system sends commands to connect each new input to the multiplexor output based on the selected virtual path identifier and virtual circuit identifier. The selected virtual path identifier and virtual circuit identifier remain assigned to the input port even if the input connection is later deleted.

10 Claims, 4 Drawing Sheets

SYSTEM AND METHOD FOR PROVISIONING VIRTUAL CIRCUITS IN BROADBAND ACCESS MULTIPLEXING ELEMENTS

BACKGROUND OF THE INVENTION

1. Field of the Invention

The present invention relates to telecommunications systems and, more specifically, to systems and methods for provisioning resources in a broadband network.

2. Description of the Prior Art

Demand for in-home data and telephony services has grown dramatically in recent years and is expected to continue to increase. Accordingly, providers of data and telephony services have sought to design and deploy broadband networks with increased delivery capacity.

One broadband technology that has become particularly popular is digital subscriber lines (DSL). DSL offers increased data transfer rates and integrated telephony and data services using the existing public switched telephone network (PSTN), which previously was used exclusively for telephone voice communications.

As the demand for DSL service has grown, service providers have needed to build-out their infrastructure for providing DSL service. In particular, service providers have needed to quickly install large numbers of network elements devoted to providing DSL service. For example, service providers have needed to install large numbers of broadband access multiplexing elements, which generally include digital subscriber line access multiplexors (DSLAM's) and miniature remote access multiplexors (MINIRAM's). Installing, managing, and administering these quickly expanding, geographically distributed DSL networks has become increasingly complex, time consuming, and expensive.

One aspect of DSL network maintenance that is very cost and labor intensive is provisioning permanent virtual circuits (PVC's) in broadband access multiplexing elements. PVC's are permanent, "always on" connections between devices in the DSL network. A physical transmission path may be divided into a certain number of virtual paths. Each virtual path may be further divided into a certain number of virtual channels. Each PVC may be identified by a virtual path identifier (VPI) and a virtual channel identifier (VCI). At a multiplexing element, PVC's may be connected using VPI's and VCI's. Thus, it is necessary to assign a specific VPI and a VCI to each of the multiplexor's input ports. This is often a difficult task because multiplexors may often contain a very high quantity of inputs, and the number of VCI's and VPI's available is limited.

There are several existing methods for assigning a VPI and a VCI to each multiplexor input. One existing scheme assigns a VPI and a VCI to each input from an algorithm based on the rack, shelf, card and port to which that input path is connected. However, this scheme is ineffective because multiplexors often contain too many racks, shelves, cards, and ports.

Another existing scheme selects a new VPI and VCI for each "new" input. A "new" input is created each time a new subscriber requests DSL service. For each new input, an available VPI and VCI is selected from a pool of available VPI's and VCI's. When a VPI and a VCI is selected for the new input they are removed from the pool. If an existing subscriber wishes to have his or her service discontinued, then an existing connection must be deleted. When an existing connection is deleted the existing VPI and VCI are placed back in the pool. However, the effectiveness of this scheme is limited because attempts to delete a virtual circuit cross connection are often unsuccessful. Thus, despite attempts to delete it, a VPI and VCI may remain assigned to a given input even if that input is not actually used by a subscriber. When a new subscriber requests service, he or she may be assigned the same VPI and VCI as the connection that the service provider had previously attempted to remove. Therefore, the new subscriber's cross connection will fail.

Thus, a need exists in the art for systems and methods for provisioning virtual circuits in broadband access multiplexing elements that are suitable for the high quantity of multiplexor inputs and that eliminate the problem of service failure due to unsuccessful cross connection deletion attempts.

SUMMARY OF THE INVENTION

Accordingly, systems and methods for provisioning virtual circuits in broadband access multiplexing elements are disclosed. Systems and methods in accordance with the invention are operable in DSL networks comprising DSL line multiplexor devices such as for example, DSLAM's, and element management systems (EMS's) for managing the operation of these same multiplexor devices. As is explained in detail below, a DSL network may comprise a large number of EMS's, with each EMS having a large number of multiplexors that it is dedicated to managing. The DSL network may also comprise a network management system (NMS) that is responsible for managing the entire network. The NMS manages individual network elements by sending commands to the EMS dedicated to managing the particular element.

When a new subscriber requests DSL service, an available input port on a multiplexor is selected to serve as the line termination port for the subscriber's line. The NMS determines if the selected input port has been previously used. If the selected input port has not been previously used, then the NMS assigns to the input port a unique VPI and VCI selected from a pool of available VPI's and VCI's. The pool is unique to each multiplexor and is maintained by the NMS. The NMS then removes the selected VPI and VCI from the pool. If the selected input port has been previously used, then the NMS assigns to the input port its previous VPI and VCI. The NMS then sends commands to the EMS to connect the selected input port's assigned VPI and VCI to the output VPI and VCI.

BRIEF DESCRIPTION OF THE DRAWINGS

The present invention will be better understood after reading the following detailed description of the presently preferred embodiments thereof with reference to the appended drawings, in which.

DETAILED DESCRIPTION

Figure 1:
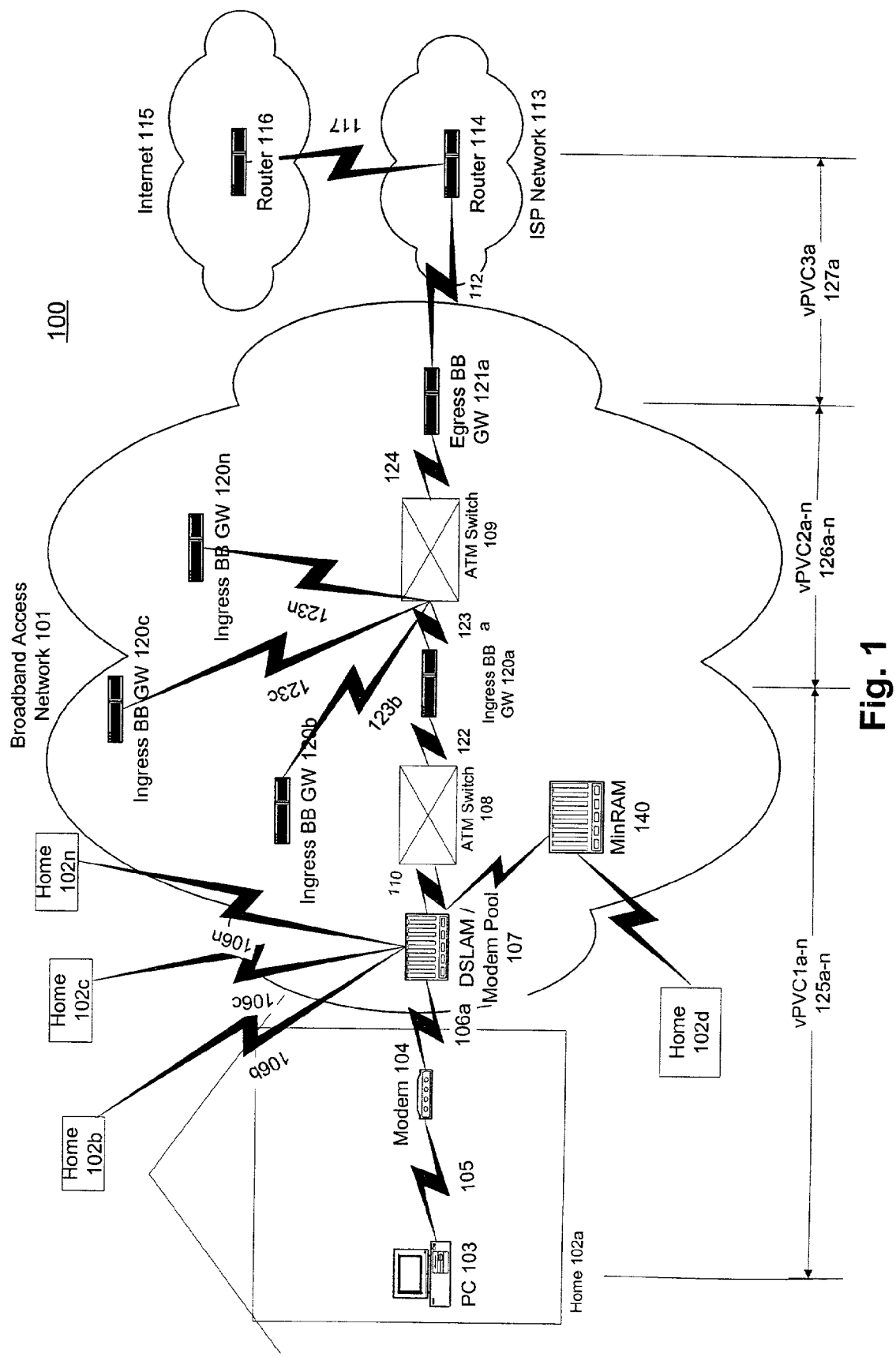
FIG. 1 is a high level diagram of an exemplary DSL network.

Systems and methods for provisioning virtual circuits in broadband access multiplexing elements in accordance with the invention are described below with reference to FIGS. 1–4. Those skilled in the art will readily appreciate that the description given herein with respect to those figures is for explanatory purposes only and is not intended in any way to limit the scope of the invention. Throughout the description, like reference numerals will refer to like elements in the respective figures.

Generally, applicants have invented systems and methods for provisioning virtual circuits in broadband access multiplexing elements. When a new subscriber requests DSL service, an available input port on a broadband access network multiplexing element such as, for example, a DSLAM, is selected to serve as the line termination port for the subscriber's line. The NMS determines if the selected input port has been previously used. If the selected input port has not been previously used, then the NMS assigns to the input port a unique VPI and VCI selected from a pool of available VPI's and VCI's. The pool is unique to each DSLAM and is maintained by the NMS. The NMS then removes the selected VPI and VCI from the pool. If the selected input port has been previously used, then the NMS assigns to the input port its previous VPI and VCI. The NMS then send commands to the EMS to connect the selected input port's assigned VPI and VCI to the output VPI and VCI.

Prior to explaining the details of an illustrative embodiment of the invention, it is useful to provide a description of a suitable exemplary environment in which the invention may be implemented.

Exemplary DSL Network Environment

1. Exemplary DSL Network

DSL is a technology that converts existing twisted-pair telephone lines into access paths for multimedia and high-speed data communications. DSL services promise to dramatically increase the speed of copper wire based transmission systems without requiring expensive upgrades to the local loop infrastructure. As used herein, xDSL refers to the numerous variations of DSL technology using the Bellcore acronyms such as ADSL (Asymmetric DSL), HDSL (high bit-rate DSL), RADSL (rate-adaptive DSL), and the like. New and improved versions of xDSL are in constant development and the invention is not intended to be limited to any single variation of the technology.

Most xDSL signals fall within the frequency range of 4 KHz to 2.2 MHz, with the range of 0 to 4 KHz reserved for the transmission of analog voice signals for plain old telephone service (POTS). The theoretical maximum amount of bandwidth between 4 KHz and 2.2 MHz is almost 70 Mbps of digital data spectrum. In practice however, only lab test conditions have ever reached higher than 60 Mbps and currently available products typically use 2 Mbps to 8 Mbps.

The different types of xDSL technologies may also be categorized as either symmetric EC xDSL or asymmetric (FDM) xDSL. A first class of EC xDSL includes Integrated Services Digital Network (ISDN), High-Bit-Rate DSL (HDSL), and Single-Line DSL (SDSL). A second class of EC XDSL includes Asymmetric DSL (ADSL) and Rate Adaptive DSL (RADSL). The modulation technologies employed with the various types of xDSL include 2-binary 1-quaternary (2B1Q) for ISDN and HDSL, carrierless amplitude phase modulation (CAP) for HDSL, SDSL and RADSL, and discrete multi-tone modulation (DMT) for ADSL and RADSL.

Generally, DMT divides the upstream and downstream bands into smaller individual or discrete bands. The modems on either end listen to these discrete bands as smaller channels within the main upstream or downstream channel. Often, one of these smaller bands will be disrupted by noise, rendering the information carried within that band useless. Rather than toss away all the information sent at that instant across the entire upstream or downstream band, only that small part is lost and needs to be retransmitted.

With CAP, the overall amplitude or power of the signal is modulated. The signal is not safeguarded against noise and often suffers from lost information, which accounts in part for the lower transmission speeds of CAP-based DSL technologies. With amplitude modulation, there is also more loss over longer ranges. The benefits of CAP over DMT are that it is simpler in design and therefore cheaper, requires less power, and generates less heat. Both power consumption and heat are serious factors when it comes to housing many of these systems together (as in a central office). DMT however, often provides the best results and maintains the full bandwidth at its maximum range of 18,000 feet. CAP signals degrade quickly after 10,000 feet.

Typical xDSL systems are implemented as follows. At the customer premises a splitter is provided which separates the xDSL signals (i.e., digital data signals) from the POTS analog voice signals. The main purpose of the splitter is to shield ordinary telephones from the high frequency xDSL signals that can have disastrous effects on the telephone or human ear. The data line from the splitter connects to an xDSL modem and the analog line connects to the telephone. With xDSL Lite and some other product models, there is no external splitter or it is combined into the xDSL modem unit. An Ethernet line will usually link the xDSL modem to the customer premises PC.

The twisted pair from the customer premises connects to an xDSL access multiplexor such as, for example a DSLAM, typically located at the incumbent local exchange carrier (ILEC) central office (CO). The twisted pair from the customer premise may also pass through a neighborhood wiring distribution frame, which is a central point where the wire pairs from several customer premises come together, and/or an ILEC remote terminal before reaching the CO. Typically, a DSLAM is a multi-module unit that houses many CO-side XDSL modems within a single shelf much like the analog modem racks of today. At the DSLAM the voice and data lines are split out along separate paths. The digital data signal goes into either an ATM concentrator or an Internet Protocol router. The analog voice signals are connected to the CO phone switch. Thus, the digital data packets go through the router out to the Internet, and the analog voice signals go through the phone switch and into the public switched telephone network.

ADSL is one particularly promising and popular form of xDSL. ADSL can transmit up to 6 Mbps to a subscriber, and as much as 832 kbps or more in both the downstream and upstream directions. Such rates expand existing access capacity by a factor of 50 or more without the need to install new wiring or cabling. An ADSL circuit connects an ADSL modem on each end of a twisted-pair telephone line, creating three information channels—a high speed downstream channel, a medium speed duplex channel, depending on the implementation of the ADSL architecture, and a POTS or ISDN channel. The POTS/ISDN channel is split off from the digital modem by filters, thus guaranteeing uninterrupted POTS/ISDN, even if ADSL fails. The high speed channel ranges from 1.5 to 6.1 Mbps, while duplex rates range from 16 to 832 kbps. Each channel can be submultiplexed to form multiple, lower rate channels, depending on the system.

ADSL modems provide data rates consistent with North American and European digital hierarchies and can be purchased with various speed ranges and capabilities. The minimum configuration provides 1.5 or 2.0 Mbps downstream and a 16 kbps duplex channel; others provide rates of 6.1 Mbps and 64 kbps duplex. Products with downstream rates up to 8 Mbps and duplex rates up to 640 kbps are currently available. ADSL modems also can accommodate ATM transport with variable rates and compensation for ATM overhead, as well as IP protocols. Downstream data rates depend on a number of factors, including the length of the copper line, its wire gauge, presence of bridged taps, and cross-coupled interference. Line attenuation increases with line length and frequency, and decreases as wire diameter increases.

FIG. 1 shows an exemplary ADSL based broadband access architecture 100. In order for an IP enabled device (e.g., personal computer 103 in home 102a) to establish a service session with a source on the Internet 115, the IP enabled device first establishes an access session with an Open Systems Interconnection (OSI) model layer 2/3 communications element (e.g., router 114) in an Internet service provider (ISP) network (e.g., ISP network 113) through an asynchronous transfer mode (ATM) based broadband access network (e.g., broadband access network 101) with a broadband access device (e.g., DSL modem 104) connected to the local loop (e.g., link 106a). An IP client (not shown) on the IP enabled device secures an IP address from the ISP using Dynamic Host Configuration Protocol (DHCP) from a DHCP server (not shown) in communication with the ISP's router. The DHCP server temporarily allocates or leases a unique IP address to the IP client. The IP client may now obtain IP based services available on the ISP network and beyond by sending and receiving packets to and from the ISP's router through the broadband access network. Sources on the Internet 115 are reached by utilizing a communications link between the ISP network and the Internet 115 (e.g., communications link 117).

In addition to the layer 2 communications elements (e.g., asynchronous transfer mode (ATM) switches 108 and 109), layer 2/3 communications elements also form a part of broadband access network 101. Specifically, a plurality of layer 2/3 communications elements (e.g., ingress broadband gateways 120a–n) reside after various layer 2 communications elements (e.g., ATM Switch 108) lying near ingress points for access device IP traffic (e.g., IP traffic from personal computer 103), and a plurality of layer 2/3 communications elements (e.g., egress broadband gateway 121a) reside after layer 2 communications elements (e.g., ATM Switch 109) lying near egress points for access device IP traffic destined for ISP networks (e.g., ISP network 113) linked to broadband access network 101. In exemplary network 100, ATM switch 108 may comprise, for example, a Lucent CBX 500 multiservice WAN switch, and ATM switch 109 may comprise, for example, a Lucent GX 550 multiservice WAN switch. Ingress and egress broadband gateways 120, 121 comprise, for example, Nortel 5000 Broadband Service Nodes.

Each of the layer 2/3 communications elements in broadband access network 101 supports the creation of layer 3 communications sessions between various communications elements within and without network 101 using layer 3 protocols such as IP. The layer 2/3 communications elements also support the creation of virtual layer 2 communications sessions or "virtual PVCs(vPVCs)" using one or more of the following protocols: Point-to-Point Protocol (PPP) over Ethernet (PPPoE), PPP over ATM (PPPoA), Layer 2 Tunneling Protocol (L2TP), Point-to-Point Tunneling Protocol (PPTP), and/or Switched Multimegabit Data Service (SMDS) Interface Protocol (SIP). A PVC is a "permanent" virtual circuit and provides an "always on" connection whether the subscribers is actively using it or not. Thus, a series of three layer 2 virtual PVCs (e.g., vPVC1a 125a, vPVC2a 126a, and vPVC3a 127a) extend from an access device (e.g., ADSL modem 104) to an ISP (e.g., ISP network 113) through broadband access network 101 (versus having a single layer 2 PVC extending from an access device to an ISP as in other broadband access networks).

The first layer 2 vPVC (e.g., vPVC1a 125a) extends from an access device (e.g., ADSL modem 103) to one of the ingress layer 2/3 communications elements (e.g., ingress broadband gateway 120a), and is the only vPVC devoted exclusively to a single IP subscriber. Typically the first layer 2 vPVC is a user authenticated PPP session. In one embodiment of the network 101 the first layer 2 vPVC is a user authenticated PPPoE session where the IP enabled device (or the operator thereof) supplies a username and domain (e.g., "user1@domain1"). Based on the domain provided, the first layer 2/3 communications element establishes a virtual layer 2 connection using L2TP over the remaining two layer 2 vPVCs to reach the appropriate ISP and the ISP provides the IP enabled device an IP address for obtaining IP based services. This model allows for the creation of access sessions with different ISPs depending on the domain provided by the IP enabled device. This model also allows IP services to be billed to a particular user on a per access session basis.

The second vPVC (e.g., vPVC2a 126a) extends from the foregoing ingress layer 2/3 communications element (e.g., Ingress Broadband Gateway 120a) to one of the egress layer 2/3 communications elements (e.g., Egress Broadband Gateway 121a). Through the use of a tunneling protocol such as L2TP, PPP aggregation occurs at the layer 2/3 ingress communications element and the multiple PPP communications sessions between access devices (e.g., access devices in homes 102b–n) served by the ingress layer 2/3 communications element are funneled into the second vPVC. The third vPVC (e.g., vPVC3a 127a) extends from the foregoing egress layer 2/3 communications element (e.g., Egress Broadband Gateway 121a) to the layer 2/3 communications element in the ISP network. In this embodiment of the invention the layer 2/3 communications element in the ISP network is an LNS capable router (e.g., layer 2/3 communications element 114). Again, through the use of a tunneling protocol such as L2TP, PPP aggregation occurs at the egress layer 2/3 communications element and the multiple PPP communications sessions from multiple L2TP IBG tunnels are concentrated onto a single L2TP tunnel by the egress broadband gateway and are funneled into the third virtual PVC. The third virtual PVC delivers a large (doubly aggregated) L2TP tunnel to the LNS router 114 where the PPP sessions are terminated and IP packets are once again routed normally.

As shown in FIG. 1, each twisted wire pair from customer premises 102a–n housing an xDSL modem 104 connects to a multiplexor device such as, for example DSLAM 107 or MiniRAM 140. Furthermore, a connection from MiniRAM 140 terminates in DSLAM 107. In exemplary network 100, DSLAM 107 may be, for example, an Alcatel 7300 DSL Access Line Multiplexor. Generally, a cross connection must be completed between the input ports of DSLAM 107 and the output port of DSLAM 107. This connection is completed using the unique VPI's and VCI's assigned to each input port and to the output port. Systems and methods for provisioning VPI's and VCI's in broadband access multiplexing elements are described below.

2. Provisioning Virtual Circuits in Broadband Access Multiplexing Elements

Figure 2:
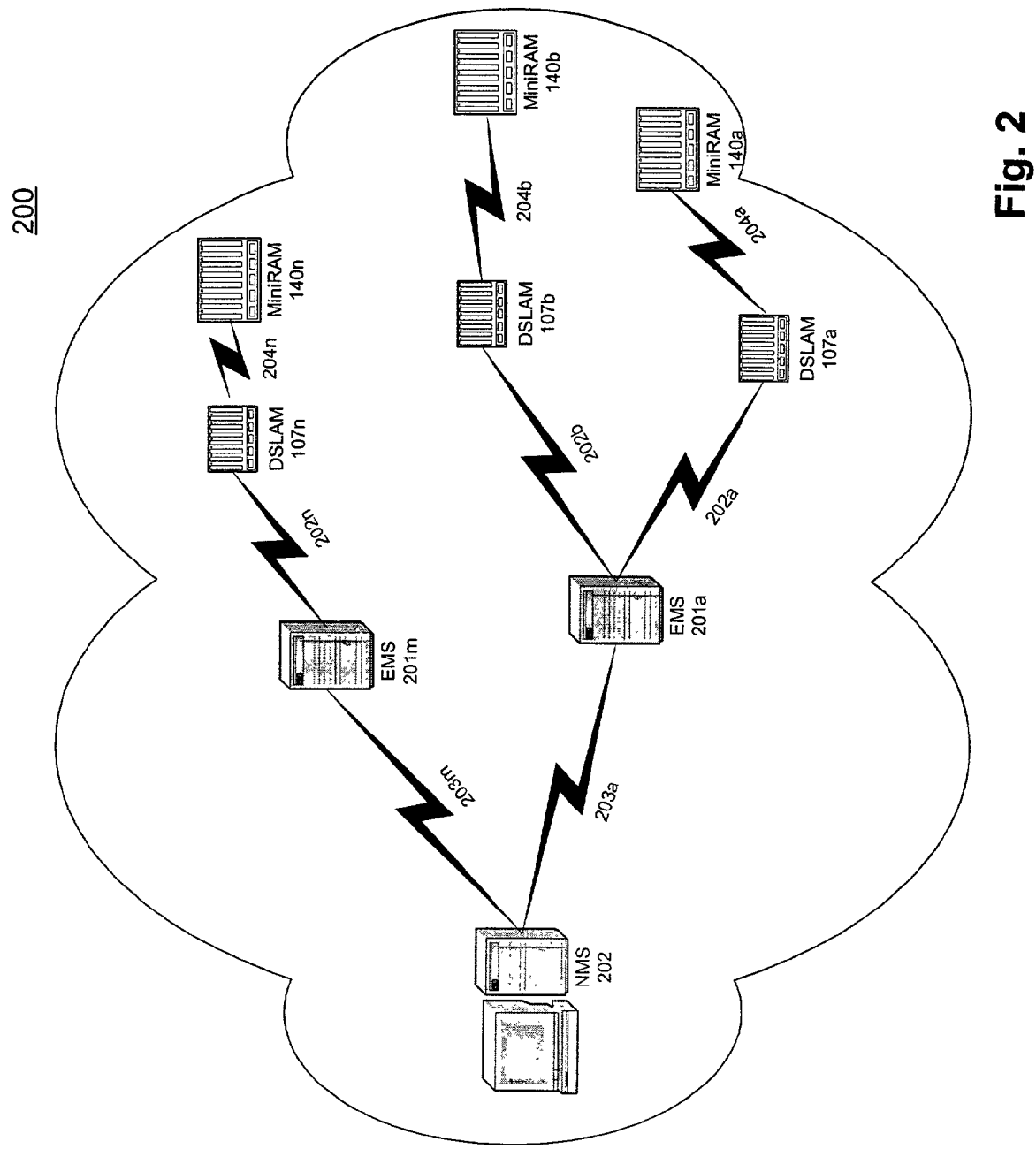
FIG. 2 is a high level diagram of an exemplary DSL element management network.

FIG. 2 depicts an illustrative DSL network management system 200 in which systems and methods provisioning virtual circuits in broadband access multiplexing elements in accordance with the invention may operate. As shown, system 200 comprises at least one network management system (NMS) 202, a plurality of element managers (EMSs) 201a–201m, DSLAMs 107a–n forming a portion of broadband access network 101, MiniRAMs 140a–n also forming a portion of broadband access network 101, and a plurality of communication paths or links 202a–n, 203a–m, 204a–m between the NMS, EMSs, DSLAMs, and MiniRAMs. NMS 202 coordinates the operation of nodes, elements, objects, cards, physical links, equipment, and the like, within network management system 200. DSLAMs 107a–n and MiniRAMs 140a–n comprise managed elements within network management system 201. EMSs 201a–m comprise intermediaries between NMS 202 and the broadband network elements including DSLAMs 107a–n and MiniRAMs 140a–n. As an intermediary, the EMSs interpret messages, such as simple network management protocol (SNMP) messages, to and from nodes in network management system 201. In one embodiment of the invention communication between the NMS 202 and the EMSs 201a–m is via X.25, serial, TCP/IP, or UDP/IP connection while communication between the EMSs 201a–m and the DSLAMs 107a–n is via SNMP over UDP/IP. In an illustrative embodiment of system 200, NMS 202 comprises, for example, an Alcatel 5620 Network Manager, EMSs 201a–m comprise, for example, Alcatel 5526 Access Management Systems, DSLAMs 107a–n comprise, for example, Alcatel 7300 DSL Subscriber Access Platform.

NMS 202 manages the algorithm that provisions virtual circuits in DSLAM's 107 a–n. NMS 202 selects a VPI and VCI for each new input to DSLAM's 107 a–n and sends commands to EMS's 201 a–m to connect the VPI and VCI of each new input to DSLAM's 107 a–n to the output of DSLAM's 107 a–n.

Figure 3:
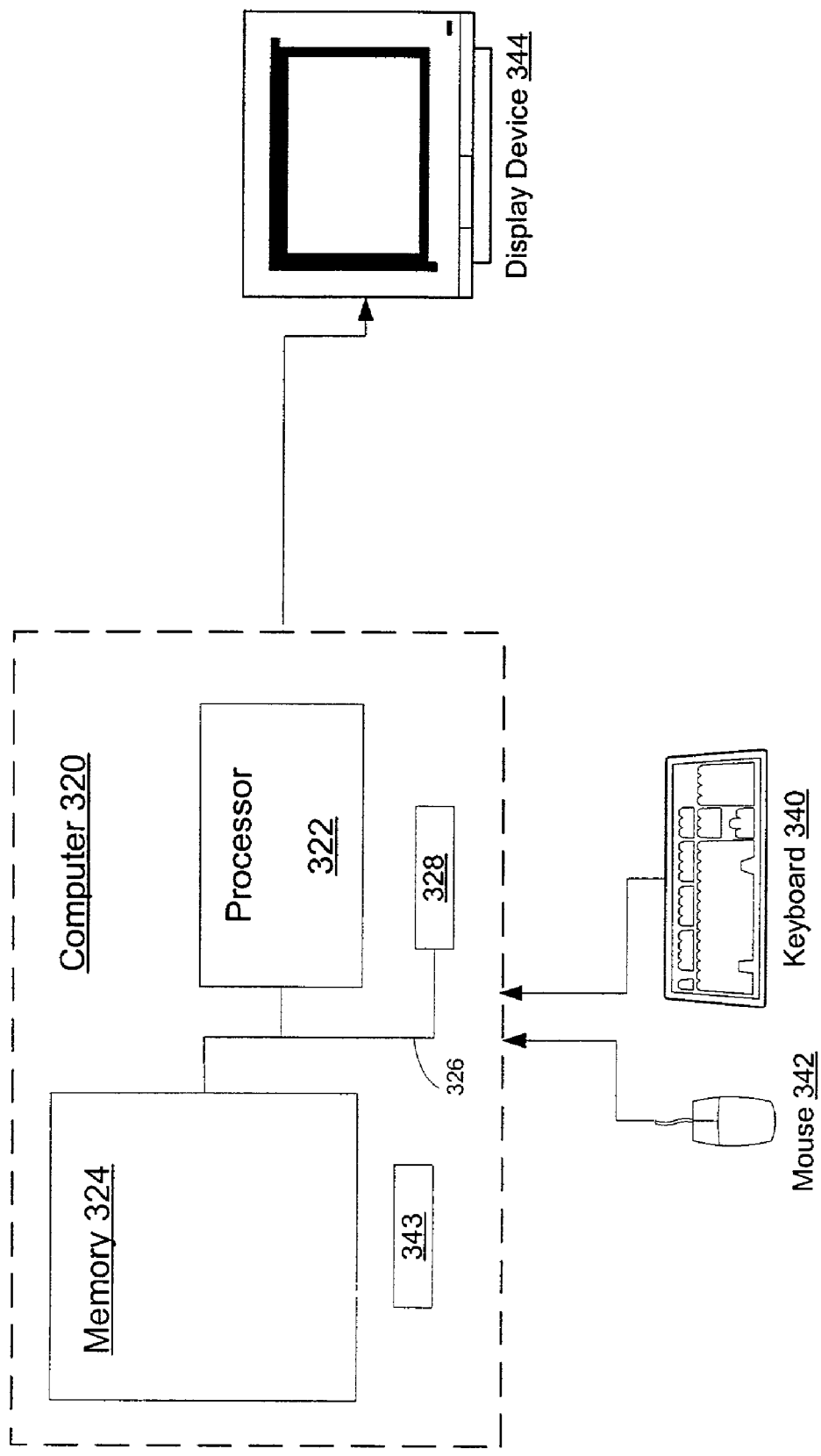
FIG. 3 is a block diagram of a computing device for use in a system in accordance with an aspect of the invention.

NMS 202 may be implemented on a generic computing system such as is shown in FIG. 3. As shown, computing device 320 includes processing unit 322, system memory 324, and system bus 326 that couples various system components including system memory 324 to the processing unit 322. The system memory 324 might include read-only memory (ROM) and random access memory (RAM). The system might further include hard-drive 328, which provides storage for computer readable instructions, data structures, program modules and other data. A user may enter commands and information into the computer 320 through input devices such as a keyboard 340 and pointing device 342. A monitor 344 or other type of display device is also connected to the system for output. Communications device 343, which may be for example a TCP/IP enable device, provides for communications in system 200. Processor 322 can be programmed with instructions to interact with other computing systems so as to perform the algorithms described below with reference to FIG. 4. The instructions may be received from network 200 or stored in memory 324 and/or hard drive 328. Processor 322 may be loaded with any one of several computer operating systems such as Windows NT, Windows 2000, Linux, and the like. Those skilled in the art recognize that while NMS 202 is illustrated as a single desktop computing system, a network of computing systems and/or other computing devices such as for example, laptop and handheld computing devices might be employed.

Figure 4:
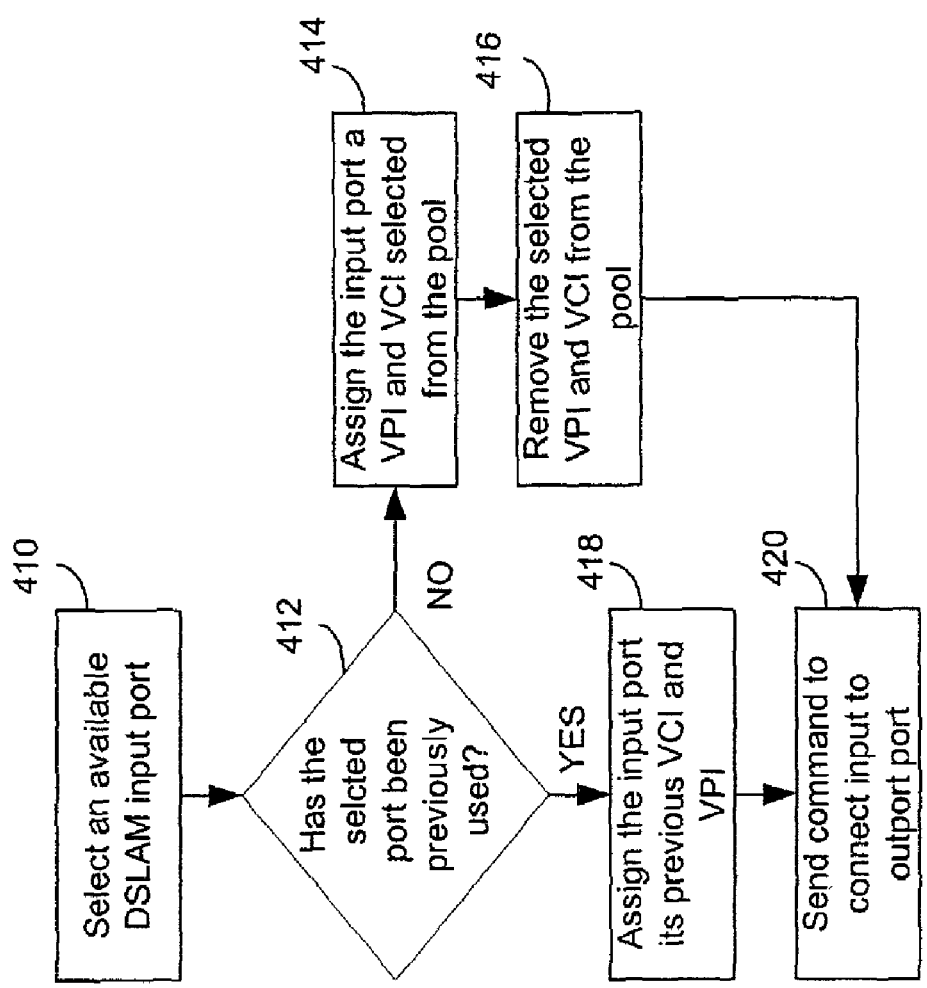
FIG. 4 is a flowchart of a method for provisioning virtual circuits in broadband access multiplexing elements.

FIG. 4 is a flowchart of a method for provisioning virtual circuits in broadband access multiplexing elements. When a new subscriber requests DSL service, NMS 202 selects an available input port on one of DSLAM's 107 a–n to serve as the line termination port for the subscriber's line at step 410. At step 412, NMS 202 determines if the selected input port has been previously used. If the selected input port has not been previously used, then, at step 414, NMS 202 assigns to the input port a unique VPI and VCI selected from a pool of available VPI's and VCI's. The pool is unique to each DSLAM 107 a–n and is maintained by NMS 202. At step 416, NMS 202 removes the selected VPI and VCI from the pool.

If the selected input port has been previously used, then, at step 418, NMS 202 assigns to the input port its previous VPI and VCI. At step 420, NMS 202 sends commands to dedicated EMS 201 a–m to complete a connection between the selected DSLAM input and the DSLAM output.

If an existing subscriber's DSL service is canceled, the subscriber's connection is deleted. However, the VPI and VCI of the subcriber;s input port remained assigned to that port and are not placed back in the pool of available VPI's and VCI's. Thus, a new subscriber's line on a different input port cannot be assigned the same VPI and VCI as the deleted connection. This eliminates the problem of service failure due to unsuccessful cross connection deletion attempts.

Thus, systems and methods for provisioning virtual circuits in broadband access multiplexing elements have been disclosed. These novel systems and methods comprise selecting a specific VPI and VCI for each new multiplexing element input from a pool of available VPI's and VCI's. Furthermore, these systems and methods eliminate the problem of service failure due to unsuccessful cross connection deletion attempts because a permanent VPI and VCI is assigned to each input port of the multiplexing element.

Those skilled in the art understand that computer readable instructions for implementing the above-described processes, such as those described with reference to FIG. 4, can be generated and stored on one of a plurality of computer readable media such as a magnetic disk or CD-ROM. Further, a general purpose computer such as that described with reference to FIG. 3 may be arranged with other similarly equipped computers in a network, and may be loaded with computer readable instructions for performing the above described processes. Specifically, referring to FIG. 3, microprocessor 322 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described in connection with provisioning of virtual circuits in DSLAM's, the systems and methods may be employed to plan other types of DSL multiplexing devices as well. Accordingly, reference should be made to the appended claims as indicating the scope of the invention.

We claim:

1. A method for provisioning virtual circuits in broadband access multiplexing elements, comprising:

selecting a multiplexing element input port for use determining if the selected input port has been previously selected for use;

if the input port has not been previously selected, then assigning to the input port a virtual path identifier and a virtual circuit identifier selected from a pool of available virtual path identifiers and available virtual circuit identifiers; and if the input port has been previously selected, then assigning to the input port its previously assigned virtual path identifier and virtual circuit identifier.

2. The method of claim 1, wherein the step of assigning to the input port a virtual path identifier and a virtual circuit identifier selected from a pool comprises removing the assigned virtual path identifier and virtual circuit identifier from the pool after it has been assigned.

3. The method of claim 1, further comprising the step of sending commands to a multiplexing element management device to complete a connection between the selected multiplexing element input port and the multiplexing element output port using the virtual path identifier and virtual circuit identifier assigned to each port.

4. The method of claim 1, wherein said pool of available virtual path identifiers and available virtual circuit identifiers is unique to each multiplexing element.

5. The method of claim 1, wherein said broadband access multiplexing element comprises a digital subscriber line access multiplexor.

6. The method of claim 1, wherein said input port comprises a port receiving a connection from one of a digital subscriber line modem or a miniature remote access multiplexer.

7. The method of claim 1, wherein said pool of available virtual path identifiers and available virtual circuit identifiers is maintained by a network management system.

8. A computer readable medium having computer executable instructions recorded thereon for performing the method recited in claim 1.

9. A system for provisioning virtual circuits in broadband access multiplexing elements, comprising:

a processor operative to execute computer executable instructions; and a memory having stored therein computer executable instructions for performing the following steps:

selecting a multiplexing element input port for use;

determining if the selected input port has been previously selected for use;

if the input has not been previously selected, then assigning to the input port a virtual path identifier and a virtual circuit identifier selected from a pool of available virtual path identifiers and available virtual circuit identifiers; and if the input port has been previously selected, then assigning to the input port its previously assigned virtual path identifier and virtual circuit identifier.

10. A system for provisioning virtual circuits in broadband access multiplexing elements, comprising:

a means for selecting a multiplexing element input port for use;

a means for determining if the selected input port has been previously selected for use; and a means for assigning to the input port a virtual path identifier and a virtual circuit identifier selected from a pool of available virtual path identifiers and available virtual circuit identifiers if the input has not been previously selected; and a means for assigning to the input port its previously assigned virtual path identifier and virtual circuit identifier if the input port has been previously selected.

* * * * *